March 15, 1938. A. J. BOCZ Re. 20,670

INTERNAL COMBUSTION ENGINE

Original Filed March 1, 1933 2 Sheets-Sheet 1

INVENTOR
Alexander J. Bocz

March 15, 1938. A. J. BOCZ Re. 20,670

INTERNAL COMBUSTION ENGINE

Original Filed March 1, 1933 2 Sheets-Sheet 2

INVENTOR.
Alexander J. Bocz

Reissued Mar. 15, 1938 Re. 20,670

UNITED STATES PATENT OFFICE 20,670

INTERNAL COMBUSTION ENGINE

Alexander J. Bocz, Detroit, Mich.

Original No. 1,982,151, dated November 27, 1934, Serial No. 659,315, March 1, 1933. Application for reissue May 10, 1937, Serial No. 141,834

9 Claims. (Cl. 123—191)

My invention relates to a new means, and is a useful discovery for preventing or decreasing the detonation or preignition of any gases in an internal combustion or thermoengine, whereby the compression pressure and the mean effective pressure are greatly increased to attain a much higher horsepower of said engine for the fuel used, which is simple in structure, economical of manufacture and highly efficient in use.

The invention has for its purpose the vaporization of liquid fuel or liquid fuel and water, which prevents the preignition or detonation of the gases in the cylinder of said engine, because the molecules of the gases are free to move without any restriction during any period of the compression stroke and the moisture of said gases is dried therein, whereby detonation is prevented.

The said invention permits the use of a much cooler fuel and air for an engine, because said fuel is vaporized and the gas and air are mixed, heated and expanded in a cylinder of said engine through a heating process. Thereby the volumetric efficiency of said cylinder is increased, therefore the mean brake pressure is also enhanced, and a much greater brake horsepower is available for less fuel.

The various features and forms are shown, in the combination and arrangement with a thermoengine, in which said means are employed without departing from the spirit and scope of the invention.

The invention will be best understood by reference to the accompanying drawings, which form a part of this specification and in which Fig. 1 is a front elevation and sectional view of one form of my invention. It is applied to an L-type thermoengine and illustrated in fragmentary section taken on line 1—1 of Fig. 2.

Figure 1:
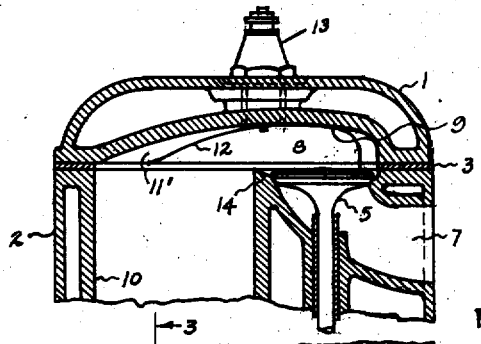
Figure 2:
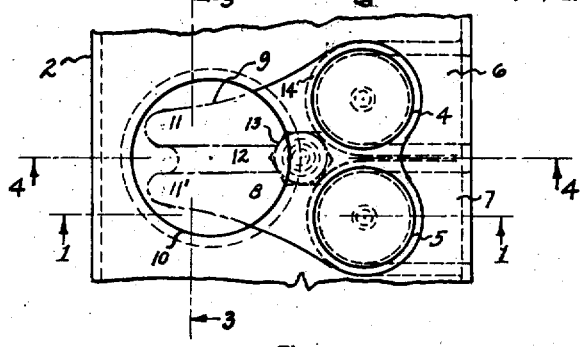
Fig. 2 is a plan view of the form shown in Fig. 1.

Figs. 1, 2, 3, and 4 show one form of my invention, which is applied to an L-type of thermoengine with the intake valve 4 and exhaust valve 5, which are positioned in the intake passage 6 and exhaust passage 7 respectively, which passages are cast into a cylinder block 2. The head 1 of said engine is separated by a gasket 3 from said cylinder block, and they are fastened together the head 1, gasket 3 and cylinder block 2 by some means, so that the combustion chamber or dome 8 always stays in the assembled position as shown in Figs. 1 and 2, so that the curved shape 9 of said dome would cover the intake valve 4 and exhaust valve 5, and the cylinder bore 10, in which the piston is reciprocating.

The chamber or dome 8 is divided into sections, 11, and 11′ by a depression 12 in the head; which forms a flame regulator and separates the combustion chamber into two sections. These sections are somewhat semi-spherical in form to give a maximum heating space with a minimum radiation surface; minimizing heat loss.

The spark plug or ignition means 13 is positioned on the arch or flame regulator so that it projects into the center of gravity of the combustion chamber, whereby the flame has the shortest possible distance to travel and a sudden explosion of the gas mixture is assured.

Therefore the highest pressure and temperature of said exploded gases are enhanced, and the dilution of the lubricating oil is overcome or prevented, and the unburned gases disappear from the exhaust gases, and the carbon deposit is also greatly eliminated in said chamber.

Figure 4:
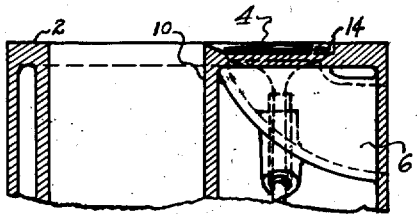
Fig. 4 is a fragmentary section view taken on line 4—4 of Fig. 2.
Figure 3:
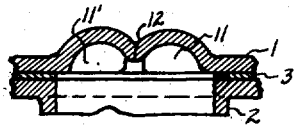
Fig. 3 is a fragmentary section view taken on line 3—3 of Fig. 2.

The gutter or pocket 14 is cast or machined on the cylinder block 2 or any of the seats of the valves 4 and 5, or both can be provided with a gutter or pocket and one form is shown in Figs. 2 and 4. The gutter or pocket is preferably formed around the seat of the exhaust valve, this portion of the combustion chamber being very hot, because the exhaust gases leave the combustion chamber 8 at that portion through the opening of said exhaust valve. When the intake valve 4 is opened, the piston moves in the cylinder bore 10 and fresh cool fuel and air are drawn through the port of said valve into the displacement of the piston, which fuel is always in contact with the gutter or pocket 14, therefore the collected or unvaporized fuel is heated, and converted into gas or gases in said cylinder, and the moisture of the gases will be dried through the heating and mixing processes therein. The remainder of the fuel, unvaporized on the top of the piston will be collected in said gutter or pocket, in which pocket they are heated and vaporized thereby a sudden explosion is attained in said chamber. The exploded gases expand on the top of the moving piston in the bore 10 of said cylinder, and the exhaust valve 5 is opened at a suitable position of said piston, thereby the burned gases are expelled from the cylinder into the atmosphere through a conveyer.

The temperature of the remainder of the burned gases is decreased through radiation from the wall of said sections. For this reason the gases are contracted and increased in weight, therefore they flow through the port of the exhaust valve 5 and leave very little or no burned gases therein, then the exhaust valve 5 is closed and the intake valve 4 opens, and a new heating process starts with fresh cool fuel and air, and the same process follows as previously described.

The intake valve is opened before or after the piston passes the upper dead center. The gas velocity would be increased a few thousand feet per second, which speed gradually decreases as soon as the piston attains its highest speed. The velocity of the gas drops, because the size of the opening of the intake valve is increased and finally the said velocity would become zero. At this moment the moisture of the gases appears in the cylinder as liquid, and said unvaporized fuel is the cause of knocks, dilution of the lubricating oil, and the unburned gases in the exhaust gases.

This invention is to prevent such trouble as above described. The temperature of almost all gases under compression increases, said increment of the temperature in said gases would create a heating process between the walls of the combustion chamber and the top of the piston. Through this heating process said gases are forced to follow the shape of the semispherical sections without any greater restriction than that of the opening of the intake valve 4; thus the dryness of the gases is insured and much higher temperature of said gases is attained, when explosion takes place.

Figure 5:
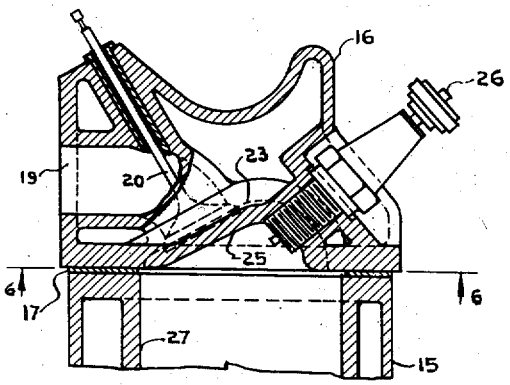
Fig. 5 is a sectional view of another modified form of my invention. It is used with an overhead valve thermoengine, and illustrated in fragmentary section taken on line 5—5 of Fig. 6.
Figure 7:
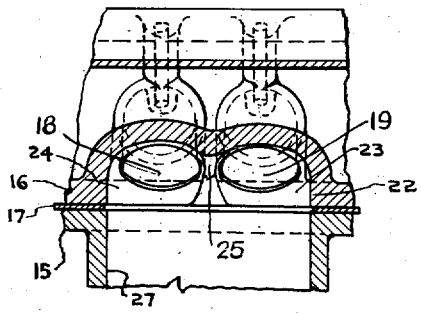
Fig. 7 is a fragmentary view taken on line 7—7 of Fig. 6.
Figure 6:
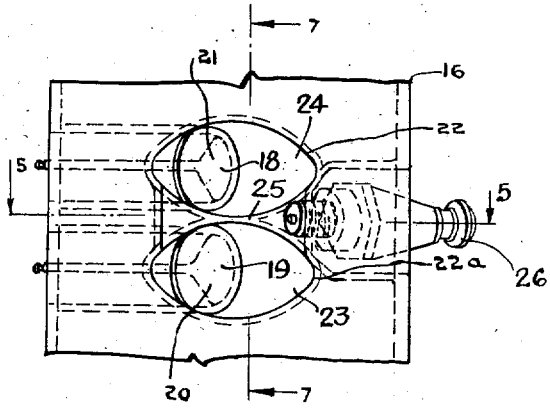
Fig. 6 is a view of the dome shown on line 6—6 of Fig. 5.

Figs. 5, 6 and 7 show another modified form of my invention, which is applied to an overhead type of thermoengine with the intake valve 21, and exhaust valve 20, which are positioned in the intake passage 18, and exhaust passage 19, respectively, which passages are cast into a head 16.

The head 16, is separated by a gasket 17, from the cylinder block 15, and they are fastened together, the head 16, gasket 17, and the cylinder block 15, by some means, so that the combustion chamber or dome 22, always remain in assembled position as shown in Figs. 5 and 6, so that the contour 22*a*, of said dome would cover the cylinder bore 27, in which the piston is reciprocating.

The chamber or dome 22, is divided into sections 23 and 24, by a depression 25, in said head; which forms an ignition supporter or flame equalizer and separates the combustion chamber 22, into double domes 23 and 24. These domes are substantially semi-spherical in form to give a maximum heating space with a minimum radiation surface, minimizing heat losses, and the moisture of the gases is stirred into a dry state therein.

The spark plug or ignition means 26, is positioned on the ignition supporter or flame equalizer 25, and projects into the center of gravity of said combustion chamber, whereby the path of the flame has the shortest, straight and unrestricted distance to travel in all parts of the domes 23 and 24, and for this reason a sudden explosion of the gaseous mixture is always assured therein.

The present invention or inventions as described are adaptable for any type of thermoengine or any engine of any number of cylinders or Diesel motor or Banki-Csonka's engine wherein water is used with the fuel to obtain a very high compression pressure without preignition, but the water cannot disassociate into its atoms, when explosion occurs, because it is not heated to become steam;—whereas by applying my method to a thermoengine, the water is heated in the gutter and becomes steam, and the temperature of said gases is increased; when the sudden explosion will take place, whose temperature is very high, and the heated steam will break up into its atoms, and they could burn with the exploded gases, therefore less fuel is used for a much greater brake horsepower.

My belief is, that the present invention is new particularly in view of the fact, that the moisture of the gases can be turned into a dry state, because the temperature of the compressed gases is increased, which increment of the temperature creates a heating process in the semispherical combustion chamber and the top of the piston. With the aid of said heating process, the gases are forced to follow the contour of the sectioned chamber, which are so curved or shaped by the igniter locator or flame regulator so that a uniform high temperature dry state of gases is insured to ignite the heated lubricant with the exploded gases, simultaneously on the top of the piston in said cylinder. Therefore the knocks of said engine are prevented and the carbon deposit in said combustion chamber is eliminated or greatly reduced.

Broadly, my invention comprises the use of the heating process, which is due to the compression of the gases or the heat of the exaust gases for converting the wet gases or water and fuel into a dry state, and permitting sudden explosion, controlled through the ignition support or flame regulator.

I am aware several attempts have been made to eliminate the knocks of an engine, and the dilution of the lubricating oil and to minimize the unburned gases from the exhaust gases. They failed, because their efforts attempted to solve one trouble at one time, whereas I combine a means to overcome all these causes through the use of the double domed combustion chamber for drying said gases. Of course, the shape and size of the combustion chamber will vary with the various types and sizes of engine. Anyone skilled in the art, knowing the size of the engine or the required mean effective pressures of the said engine or engines with which my invention can be used, can with a mathematical certainty compute the shape or contour of the combustion chamber to give the most desirable mean effective pressure to the particular engine selected.

While I have illustrated and described my invention, I do not wish to limit myself to the precise details of structure shown, but desire to avail myself of such variations and modifications as come within the scope of the appended claims.

Having thus described my invention what I claim as new and desire to secure by Letters Patent is:

1. Means for vaporizing the liquid precipitating in a combustion chamber of an internal combustion engine, comprising a divided dome for said chamber having an ignition means locator, ignition means positioned on said locator, a valve seat formed in the wall of said chamber, a valve adapted to sit upon said seat, heated gutter means around the seat of said valve for collecting liquid precipitated in said chamber and vaporizing the same, said divided dome being adapted to facilitate mixing of the gases in said combustion chamber to promote vaporization.

2. Means for vaporizing the liquid precipitating in a combustion chamber of an internal combustion engine, comprising a divided dome for said chamber having a flame equalizer, ignition means positioned on said flame equalizer, two valve seats formed in the wall of said chamber one under each dome, a valve for each of said seats, heated gutter means around the seat of each of said valves for collecting liquid precipitated in said chamber and vaporizing the same, said divided dome being adapted to facilitate mixing of the gases in said combustion chamber to promote vaporization.

3. A double domed compression chamber in the cylinder of an internal combustion engine, including a flame equalizing wall between said domes and ignition means thereon so arranged that the path of the flame to all parts of said domes is straight and unrestricted.

4. A compression chamber in the cylinder of an internal combustion engine, comprising two substantially semi-spherical domes, a flame equalizer between said domes and ignition means on said flame equalizer said flame equalizer and said ignition means being so related as to insure the shortest straight path of the flame to all points of said semi-spherical domes without any restriction thereof.

5. In an internal combustion engine, walls forming a combustion chamber, said walls including a partition giving the chamber a double domed shape and dividing the chamber into two sections, one under each dome, ignition means so arranged between said sections that the path of the flame to all points of the sections is straight and unrestricted.

6. Means for vaporizing the liquid precipitating in a combustion chamber of an internal combustion engine, comprising a divided dome for said chamber having an ignition means locator, ignition means positioned on said locator, two valve seats formed in the wall of said chamber, a valve for each of said seats, heated gutter means around the seat of each of said valves, one of said valves being an intake valve and one of said valves being an exhaust valve, for collecting liquid precipitated in said chamber and vaporizing the same, said divided dome being adapted to facilitate mixing of the gases in said combustion chamber to promote vaporization.

7. Means for vaporizing liquid precipitating in a combustion chamber of an internal combustion engine, comprising a divided dome for said chamber having an ignition means supporter, ignition means positioned on said supporter, valve seats formed in the wall of said chamber, valves adapted to sit upon said seats, heated gutter means around the seats of said valves for collecting liquid precipitated in said chamber and vaporizing the same, said divided dome being adapted to facilitate mixing of the gases in said combustion chamber to promote vaporization.

8. Means for vaporizing the liquid precipitating in a combustion chamber of an internal combustion engine, comprising a divided dome for said chamber having an ignition means locator, ignition means positioned on said locator, an exhaust valve seat formed in the wall of said chamber, a valve adapted to sit upon said seat, heated gutter means around the seat of said valve for collecting liquid precipitated in said chamber and vaporizing the same, said divided dome being adapted to facilitate mixing of the gases in said combustion chamber to promote vaporization.

9. Means for vaporizing the liquid precipitating in a combustion chamber of an internal combustion engine, comprising a divided dome for said chamber having an ignition means supporter, ignition means positioned on said supporter, an intake valve seat formed in the wall of said chamber, a valve adapted to sit upon said seat, heated gutter means around the seat of said valve for collecting liquid precipitated in said chamber and vaporizing the same, said divided dome being adapted to facilitate mixing of the gases in said combustion chamber to promote vaporization.

ALEXANDER J. BOCZ.